United States Patent
Sherer et al.

(10) Patent No.: US 6,434,165 B1
(45) Date of Patent: Aug. 13, 2002

(54) METHOD AND SYSTEM TO ABORT DATA COMMUNICATION TRAFFIC IN A COMMUNICATION NETWORK

(75) Inventors: Paul Sherer, Danville; Kenneth Araujo, Sunnyvale; Peter Si-Sheng Wang, Cupertino, all of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/136,795

(22) Filed: Aug. 19, 1998

(51) Int. Cl.⁷ .................................................. H04J 3/16

(52) U.S. Cl. ........................................ 370/465; 714/758

(58) Field of Search ................................. 370/465, 464, 370/474, 503, 401, 389, 410, 246, 447, 450, 461, 462, 438, 431, 384, 397, 252, 254, 409; 714/758, 746, 756, 754, 752, 747, 751, 759, 760, 761, 762, 764, 768

(56) References Cited

U.S. PATENT DOCUMENTS 5,438,571 A * 8/1995 Albrecht et al. ............ 370/408
6,101,180 A * 8/2000 Donahue et al. ............ 370/270

* cited by examiner

Primary Examiner—Dang Ton
(74) Attorney, Agent, or Firm—Wagner Murabito & Hao LLP

(57) ABSTRACT

A communications network system that transmits and receives communication frames that include a transmission status section that indicates a communication frame transmission is aborted. In one embodiment, a transmission status section includes a cyclical redundancy check value that is non-matching with the information in the communication frame. For example, a non-matching cyclical redundancy check value is created by generating a one's compliment of a CRC calculated based upon the information within a communication frame. The communication network includes a wireless network, a wired network (e.g., an Ethernet network) and a data cable system that transmits a data over cable media access control (MAC) frame with an Ethernet/[ISO8802-3] type packet protocol data unit payload.

12 Claims, 12 Drawing Sheets

310

| Data 311 | Transmission Status 315 |

FIG. 3A

METHOD AND SYSTEM TO ABORT DATA COMMUNICATION TRAFFIC IN A COMMUNICATION NETWORK

FIELD OF THE INVENTION

The present invention relates to the field of data communications. More particularly, the present invention relates to a method and system to abort information being transmitted over a communications network.

BACKGROUND OF THE INVENTION

Communication networks have become virtually indispensable in building a thriving economy and typically play an essential role in generating prosperity in a modem society. Communication networks permit users to readily gain access to and exchange information of all types (e.g., sound, text, numerical data, video, graphics, multimedia, etc.). Increasing communication efficiency facilitates greater productivity and reduced costs in numerous activities. Information transmitted over communication networks is utilized in the performance of a number of functions, including the conveyance and analysis of ideas and trends in most areas of business, science, education and entertainment. Typically, a communications network transmits a significant amount of information to peripheral devices for processing and use in performing designated tasks.

The amount of information flowing through a typical communication network is not constant. At times the peripheral devices coupled to a communication network require more information to perform their designated tasks than other times. In addition, most communication systems are expanded over time to include additional peripheral devices, resulting in increased demands for bandwidth. Bandwidth is the amount of data transmitted over a communications network in a given period of time. Even if the absolute number of peripheral devices coupled to a communication network does not change, older peripheral devices are usually replaced by newer, more advanced peripheral devices that increase bandwidth requirements.

Generally, communication network resources are relatively expensive and it is uneconomical to build a network with enough bandwidth to instantaneously handle all possible information transmission requests under worst case scenarios. Communication networks built with the ability to handle the maximum possible communication load that all the peripheral devices could generate if they all tried to access the network at one time are usually inefficient. In such a communication network some network resources are usually idle most of the time and typical communication networks are built with limited resources. Upgrading communication network facilities to provide increased bandwidth capacity for new peripheral devices is usually an expensive, time-consuming, and disruptive process. Communication network facility upgrades are not undertaken lightly and advanced communication networks are typically harder to maintain, service, and administer.

Even though limiting communication network resources is economically efficient in many instances, the limitation impedes a system's performance in certain situations. Complicating matters is the fact that communication networks do experience higher activity and traffic at certain peak operating times. For example, a communication network's resources are usually pushed to capacity when numerous multiple peripheral devices attempt to log onto and transmit data over the network simultaneously or when an application is transmitting a very large file in a burst. In such situations some of the peripheral devices can not communicate with one another and a transfer of information is delayed. When the amount of data to be transmitted exceeds a network's bandwidth, the network becomes overloaded and the time or "latency" for transmitting a packet of data increases dramatically.

Usually, communication systems convey a wide variety of information and some information is more critical than other information to the operation of peripheral devices. A number of factors contribute to the importance or priority of a particular piece of information or data. In many instances, operational constraints of peripheral devices dictate that certain information is essential to the operations of a system and has more sensitive latency tolerances. It is also important to retain adequate bandwidth resources to transmit network control commands and information related to maintaining an adequate flow of information through a communication network. For example, key network administration data, such as communication network control information, is typically critical to the operation of the communication network.

Communication of information is usually restrained during times of peak communication traffic, including delays in communication of high priority information. Since most communication networks experience some periods of increased communication traffic, limited bandwidth generally leads to important or high priority information not being conveyed in a timely manner. Typically such communication networks are administered in a manner that permits only one device or entity to communicate on a path at a time and devices typically have to compete for communication network resources. Usually the basic operating principle of such a system is the items first in are those first out (FIFO). The resulting "queuing" of information presents additional problems. As long as lower priority information, such as information related to non-critical activities (e.g., e-mail messages, etc.) is being transmitted on a communications network, successive higher priority information cannot be transmitted over the network.

A number of communication networks operate in an environment in which information is divided into segments or frames. Typically, one segment of information is transmitted at any given time and other frames wait in turn until the opportunity arises for them to be sent over the network. Data that is not sent is dropped or the device it originated from has to keep attempting to get it onto the network. Delays incurred while a device waits to obtain access to network resources increases the detrimental affects of queuing high priority traffic behind lower priority traffic. In addition to waiting for lower priority data to complete transmission, once high priority data reaches the top of the queue it must wait while network resources become available. Data comprising important information should be transmitted expeditiously in order to keep the communication network and components or devices coupled to it operating properly.

Peripheral devices typically require a certain minimal bandwidth or amount of critical information to be conveyed in a timely manner to maintain adequate operational performance. The more efficiently a communication network utilizes its limited resources the greater the probability it will be capable of addressing network control and peripheral component requirements. The efficiency of a communication system is determined by a number of factors. For example, a communication system's maximized utilization of its entire throughput or bandwidth capabilities greatly enhances the amount of information that is transmitted over a communication network in a specific period of time. An efficient communications network also has the ability to expeditiously transmit high priority data.

What is required is a system and method that provides access to communication network resources in an efficient and timely manner. The system and method should permit information transmissions to be aborted and facilitate the availability of communication network resources for other communications. The system and method should increase the probability that higher priority data in fixed length data communication frames is granted access to communication bandwidth expeditiously while minimizing impacts to communication flow and conserving communication network resources. For example, it should be applicable to existing communication networks in a manner that preserves the usefulness of communication protocols while minimizing adverse affects on network infrastructure.

SUMMARY OF THE INVENTION

The present invention is a system and method that provides access to communication network resources in an efficient and timely manner. The system and method of the present invention permits information transmissions to be aborted and facilitates the availability of communication network resources for other communications. The system and method increases the probability that higher priority data in data communication frames are granted access to communication bandwidth expeditiously while minimizing impacts to communication flow and conserving communication network resources. For example, it is applicable to existing communication networks in a manner that preserves the usefulness of communication protocols while minimizing adverse affects on network infrastructure.

In one embodiment of the present invention, standard error detection indicators are manipulated to cause information in aborted communication frames transmissions to be discarded. For example, a cyclical redundancy check (CRC) is utilized in one embodiment of the present invention. When a frame is intentionally aborted during transmission an non-matching CRC is inserted, such as a one's compliment of the correct CRC. The present invention is implemented in a number of communications network systems and methods, such as a wireless communication system that transmits a media access control (MAC) frame with a data unit payload. In another embodiment, the present invention operates in a data cable system that transmits a data over cable media access control (MAC) frame with an Ethernet/[ISO8802-3] type packet protocol data unit payload. In one embodiment of the present invention, communication frames are aborted in order to make communication resources available for transmission of higher priority data.

DESCRIPTION OF THE DRAWINGS

The accompanying drawings which are incorporated in and form a part of this specification, illustrate embodiments of the invention and together with the description, serve to explain the principles of the invention:

FIG. 3A is a block diagram of one embodiment of a communication frame 310 utilized in the present invention.

BEST MODE FOR CARRYING OUT THE INVENTION

Reference will now be made in detail to the preferred embodiments of the invention, a method and system to abort information being transmitted over a communications network, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention is a system and method that optimizes utilization of communication network resources. The system and method of the present invention permits information transmissions to be aborted and facilitates the availability of communication network resources for other communications, such as high priority data. The present system and method provides access to communication network resources expeditiously while minimizing impacts to communication flow and conserving communication network resources.

Figure 1:
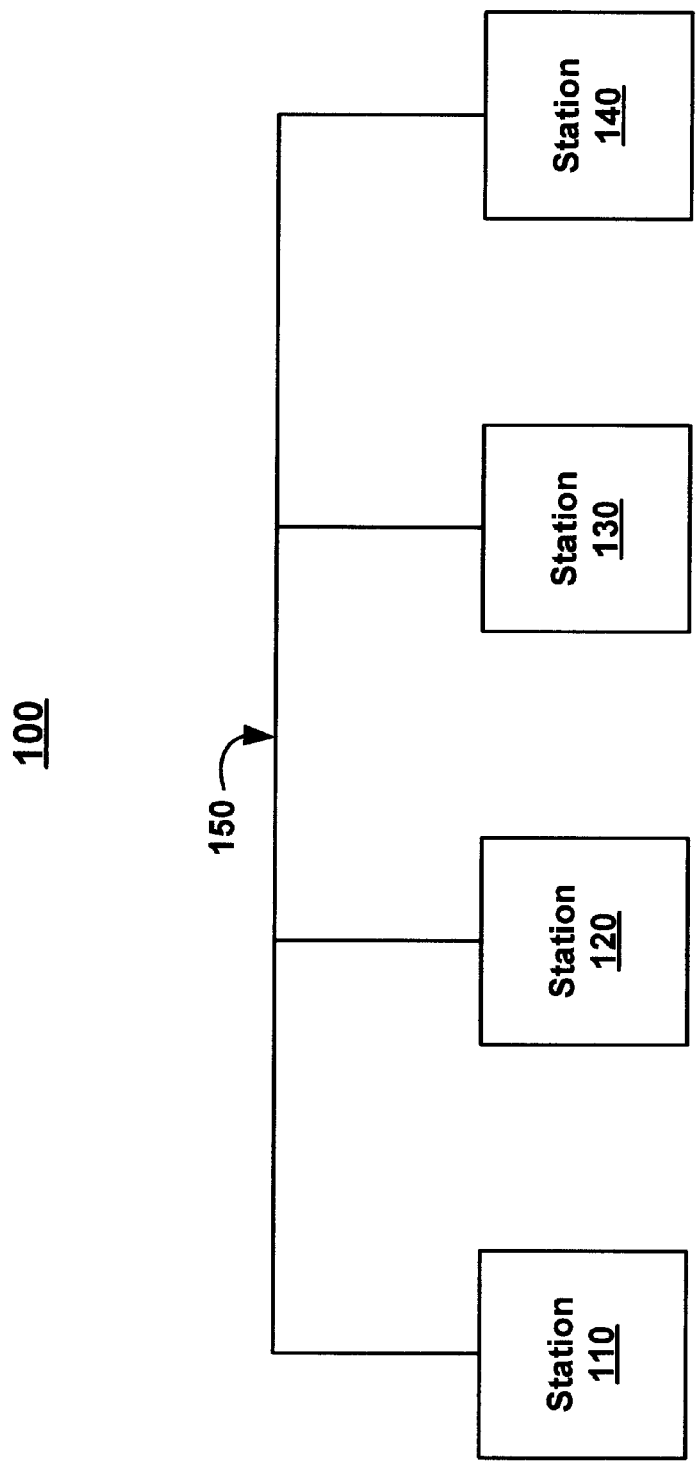
FIG. 1 is a block diagram of communications network 100, one embodiment of a system utilizing the present invention in data communication frames at a link level.

In one embodiment, the present invention is employed in a system utilizing a transmission protocol where data exchanges between peers involve data communication frames at a link level. FIG. 1 is a block diagram of one embodiment of a system utilizing data communication frames at a link level, communications network 100. Communications network 100 comprises a communication station 110, communication station 120, communication station 130, communication station 140, and communication medium 150. Communication medium 150 is electrically coupled to station 110, station 120, station 130 and station 140. Communication medium 150 comprises twisted pair cable, coaxial cable, fiber optic cable, radio waves, and microwaves. Communication stations 110 through 140 are peripheral devices adapted to transmit and receive data over communication medium 150. When communicating with each other, stations 110 through 140 encapsulate data in communication frames. In one embodiment, communications network 100 operates in an Ethernet protocol environment.

Figure 2:
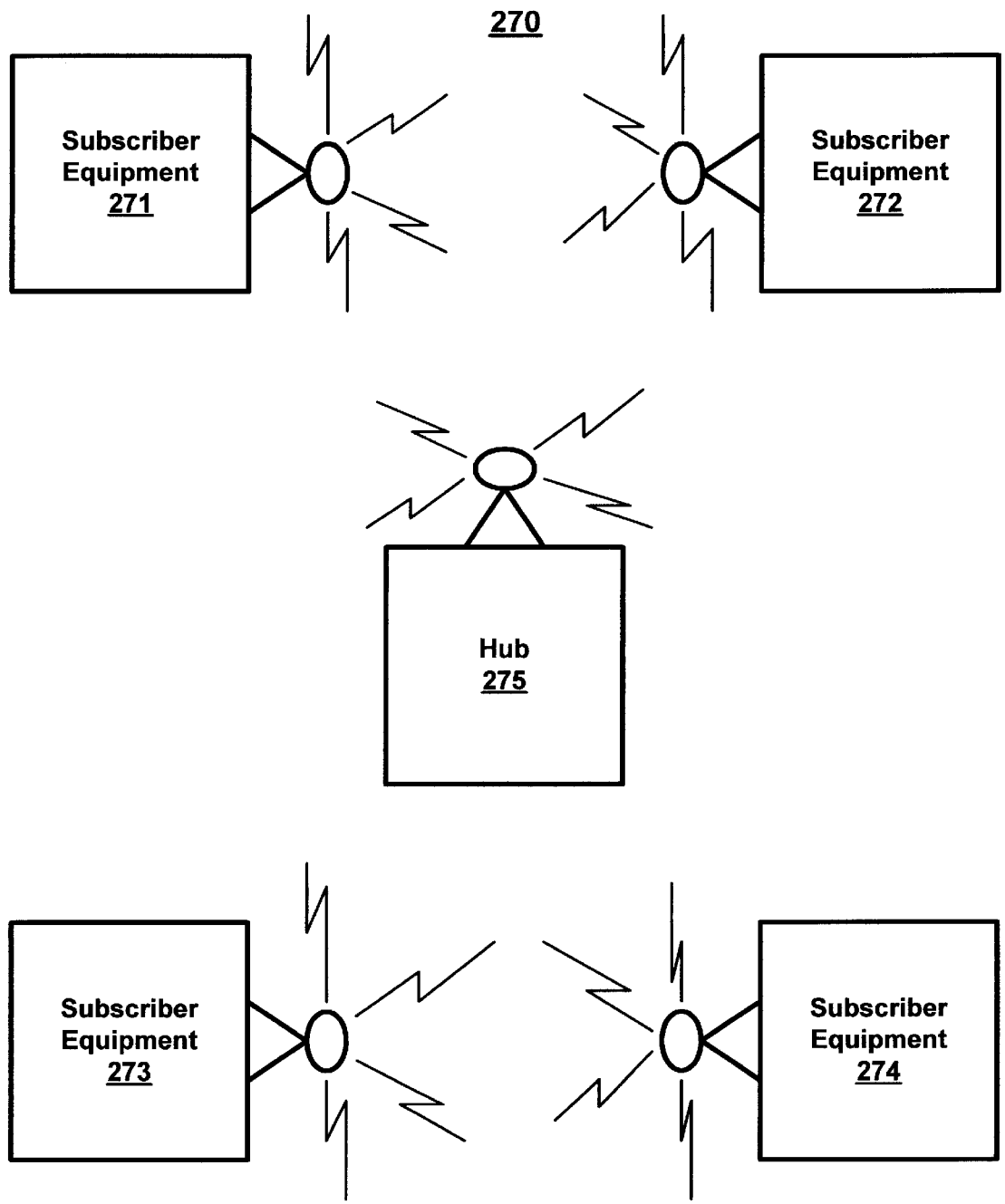
FIG. 2 is a block diagram of communications network 270, one embodiment of communications network 100.

FIG. 2 is a block diagram of communications network 270, one embodiment of communications network 100. In communications network 270 the communication stations comprise subscriber equipment and hub. Communications network 270 comprises subscriber equipment 271, subscriber equipment 272, subscriber equipment 273, subscriber equipment 274, and communications hub 275. Subscriber equipment 271, subscriber equipment 272, subscriber equipment 273, subscriber equipment 274, and communications hub 275 are communicatively coupled. Subscriber equipment 271 through 274 and communication hub 175 are peripheral devices adapted to transmit and receive data via radio frequencies. Subscriber equipment 271 through 274 and communications hub 275 encapsulate data in data communication frames that are compatible with wireless networks such as Local Multipoint Distribution System (LMDS). One embodiment of the present invention is implemented on a communication network conveying real time information such as video and audio communication.

Figure 3A:
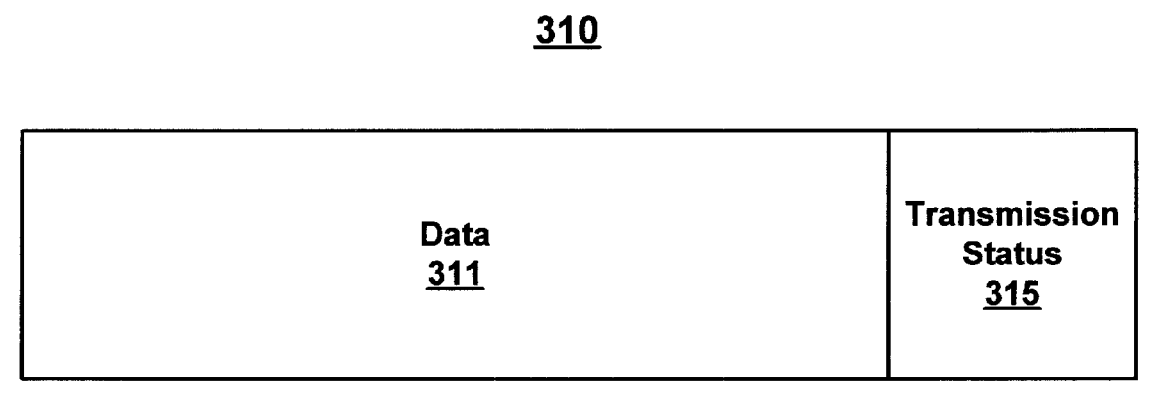

FIG. 3A is a block diagram of one embodiment of a communication frame 310. Communication frame 310 comprises a data section 311 and transmission status section 315. Data section 311 comprises the information one station is sending to another station. Transmission status section 315 comprises an indication of a transmission status, including indications if the transmission is being aborted. In one embodiment of the present invention transmission status section includes error detection information. If a communication frame is aborted after a transmission of the communication frame has begun the error detection information is manipulated to indicate there is an error (e.g., the frame is being aborted) in the transmission.

Figure 3B:
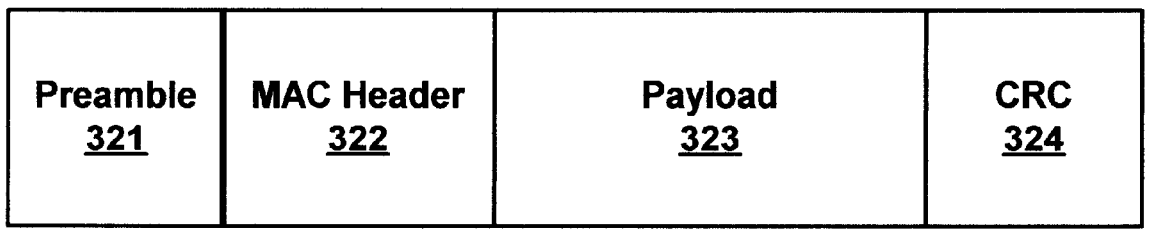
FIG. 3B is a block diagram illustrating another embodiment of the present invention implemented in a communication frame 320.

FIG. 3B is a block diagram illustrating another embodiment of the present invention, a communication frame 320. Communication frame 320 comprises a preamble 321, MAC header 322, data payload 323 and CRC section 324. Preamble 321, MAC header 322 and payload 323 are one embodiment of data section 311. Preamble 321 comprises synchronization symbols. MAC header 322 comprises frame addressing information. Communication frame 320 is similar to communication frame 310. Data payload 323 comprises information such as control commands, user data, application data, information related to the operations of a peripheral device or a communications network, etc. CRC section 324 is one embodiment of transmission status section 315 and includes an indication (e.g. a CRC value) that notifies a receiving device (e.g., subscriber equipment 171) if communication frame 320 transmission is aborted and information should be discarded.

In one embodiment of the present invention a communication frame (e.g., communication frame 310) is transmitted over a communication network (e.g., communications network 270). If an indicator in the communication frame (e.g., transmission status indicator 315) indicates a communication frame is valid a receiving device or component (e.g., subscriber equipment 271) processes information in the communication frame. If an indicator in the communication frame indicates that the communication frame was aborted during transmission, a receiving device or component discards information in the communication frame. The present invention includes a variety ways to indicate a communication frame is aborted during transmission, for example manipulating standard error detection indicators included in the communication frame.

One embodiment of the present invention utilizes CRC flags in a transmission status section (e.g., CRC section 324) to indicate the status of a communication frame. A CRC value is derived from a mathematical calculation based upon information included in the communication frame. A sending device (e.g. subscriber equipment 275) performs a calculation on the fly as a communication frame is being transmitted. The resulting value is based upon transmitted data and is inserted in a designated position of the communication frame (e.g., CRC 324). A receiving device (e.g., hub 271) performs a similar verification calculation based on information actually received and compares the results against the CRC that is sent with the communication frame. If the CRC values match the receiving device treats the communication frame as valid. If the CRC value transmitted in a communication frame does not match the CRC value computed from the information actually received, the communication frame is considered invalid and the receiving device discards the communication frame.

There are a variety of ways to generate a CRC and test its compatibility with a communication frame. For example, in one embodiment a sending device applies a polynomial to a block of data that is to be transmitted and appends the resulting CRC value to the block. A frame is divided by a predetermined polynomial and the remainder of this division is added to the frame prior to transmission. A receiving device divides a received frame by the same predetermined value. Since the remainder is added to the frame prior to transmission, the calculation performed by the receiver should result in a remainder of zero. A non zero remainder indicates the frame should be discarded. In another embodiment a communication frame is treated as a single binary integer and is divided by some constant. In this embodiment resulting remainders are transmitted with the communication frame and the transmitted remainder is compared to the remainder obtained by the receiver on performing a similar division. If the remainders do not match information in the communication frame is discarded.

A non-matching CRC value in a communication frame of the present invention results for a variety a reasons. For example, a non-matching CRC value results if information included in the communication frame is corrupted during transmission. Information included in the communication frame could be corrupted due to electromagnetic interference, power surges, defective transmitting or receiving equipment, etc. A non-matching CRC value also results if a transmitting device causes a non-matching CRC value to be transmitted with a communication frame. For example, a non-matching value is inserted by a transmitting device (e.g. hub 275) into a transmission status section (e.g., abort indicator 324) when the transmitting device aborts the transmission of a communication frame after the transmission of the communication frame has started and wants the receiving device to discard information in the transmitted communication frame.

In one embodiment of the present invention in which a communication network is transmitting signals representing bits (e.g., binary values such as 1's and 0's) a non-matching CRC value results from a deliberate manipulation of the bits in a communication frame. For example, in one embodiment a non-matching CRC is represented by a one's compliment value of the correct CRC (switching the 1's to 0's and 0's to 1's in a correct CRC). This embodiment provides greater probability that a receiving device recognizes a communication frame that was aborted during transmission. If an error or corruption is entered into information during transmission, it is less likely that a receiving device will perform a calculation based upon corrupted information and coincidentally have it match an otherwise non-matching CRC value intentionally inserted during transmission. In another embodiment, a correct CRC is calculated based upon specific information to be included in a communication frame. Then the transmitting device manipulates the information in the frame (e.g., adds miscellaneous bits) without making corresponding changes to the originally calculated CRC value. The transmitting device sends a communication frame with the. manipulated data, and the original CRC value which is non-matching with the "new" (manipulated) information.

Figure 4:
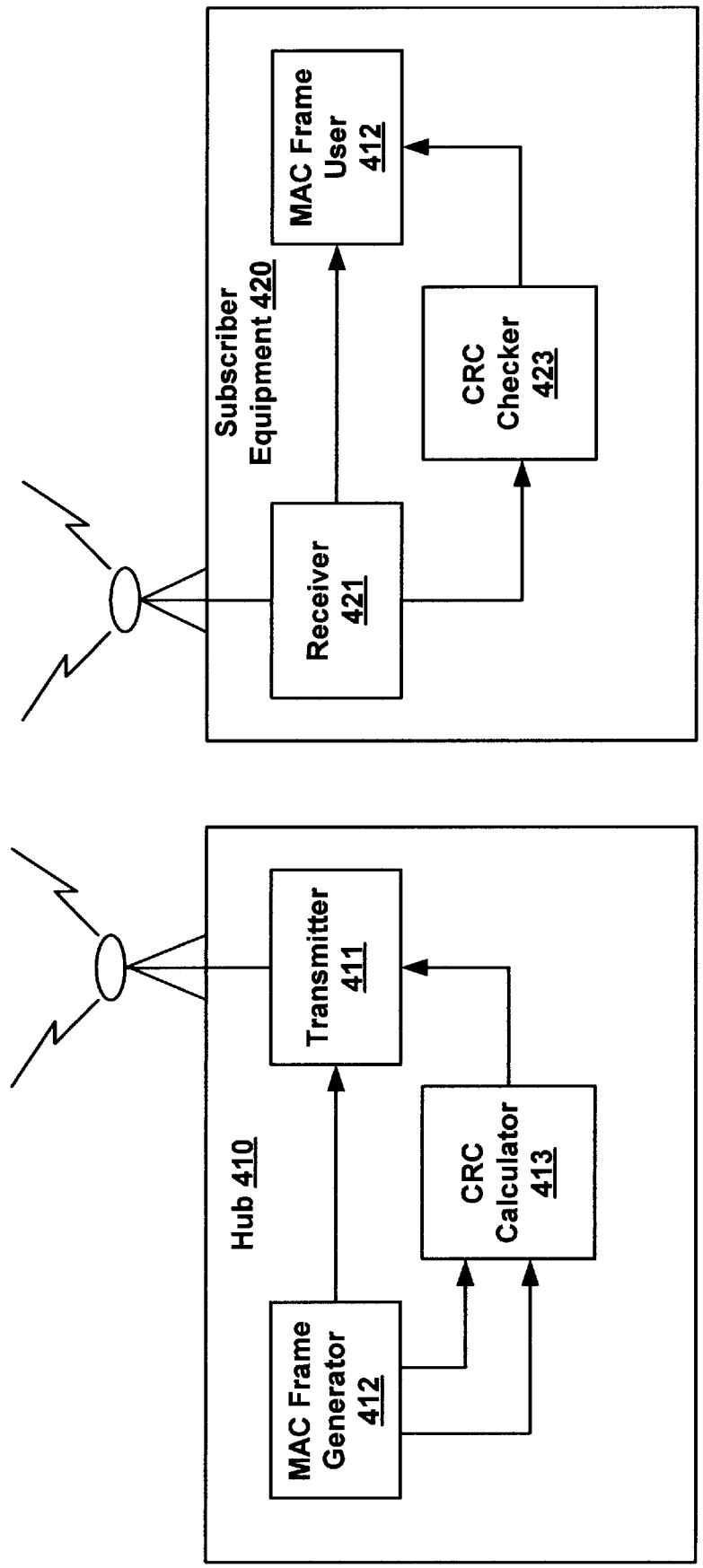
FIG. 4 is a block diagram illustrating one embodiment of components included in a communications network 400, one embodiment of the present invention.

FIG. 4 is a block diagram illustrating one embodiment of components included in communications network 400, one embodiment of the present invention. Communication network 400 comprises hub 410 and subscriber equipment 420. Hub 410 comprises transmitter 411, MAC frame generator 412, and CRC calculator 413. MAC frame generator 412 is coupled to transmitter 411 and CRC calculator 413, which is also coupled to transmitter 411. Subscriber equipment 420 comprises receiver 421, MAC frame user 422 and CRC Checker 423. Receiver 421 is coupled to MAC frame user 422 and CRC checker 423, which is also coupled to MAC frame user 412. Transmitter 411 and receiver 421 are communicatively coupled to communicate information.

In one embodiment of communications network 400 information flows from transmitter 411 to receiver 421. MAC frame generator 412 produces and configures a communication frame (e.g. communication frame 320) with the exception of a transmission status indicator (e.g., CRC section 324) and forwards those portions of the MAC frame onto transmitter 411. Information regarding the portions of the MAC frame constructed by MAC frame generator 412 is fed into CRC calculator 413. CRC calculator 413 determines the correct CRC value based upon the information included in the MAC frame. In one embodiment the CRC calculation is based on information starting with the MAC header and does not including the preamble. If a message is to be sent completely and not intentionally aborted, CRC calculator 413 attaches the correct compatible CRC to the MAC frame. If a message is not to be sent completely and aborted, CRC calculator attaches a non-matching CRC (e.g., a one's compliment of the correct CRC). Transmitter 411 transmits MAC communication frames completed by MAC frame generator 412 and CRC calculator 413 to receiver 421.

Receiver 421 receives frames transmitted by transmitter 411 and determines if information communicated in a MAC communication frame should be processed or discarded. Receiver 421 forwards the received frames to MAC user 412 and information regarding the MAC frame such as the length or number of bits in the received frame to CRC checker 423. In one embodiment CRC checker 423 calculates a CRC value based upon the received information and compares it to the value transmitted with the frame (e.g., the value in CRC section 324). If the two CRC values match, CRC checker 423 notifies MAC frame user 412 that the information is valid. If the two values do not match, CRC checker 423 notifies MAC frame user 412 that the information is invalid. MAC frame user 412 utilizes the information included in the MAC frame to perform its designated tasks if CRC checker 423 indicates the information is valid. MAC frame user 412 does not utilize the information included in the MAC frame to perform its designated tasks and discards or disregards the information if CRC checker 423 indicates the information is invalid.

Figure 5A:
FIG. 5A illustrates one of the possible configurations of a MAC communication frame transmitted in communications network 400.

FIG. 5A illustrates one of the possible configurations of a MAC communication frame transmitted in communications network 400. MAC communication 510 comprises preamble A 511, MAC header A 512, payload A 513 and CRC A 514. Preamble A 511 is coupled to MAC header A 512, which is coupled to payload A 513 and payload A 513 is coupled to CRC A 514. MAC communication frame 510 arises in a situation in which a communication network is utilized to transmit payload A 513 comprising 193 bytes of data in one example. Preamble A 511 and MAC header A 512 are configured to correspond to payload A 513. In one embodiment preamble A 511 comprises 6 bytes, MAC header A 512 includes 8 bytes of information and CRC A 514 includes 4 bytes. CRC A 514 is calculated based upon the information in communication frame 510.

Figure 5B:
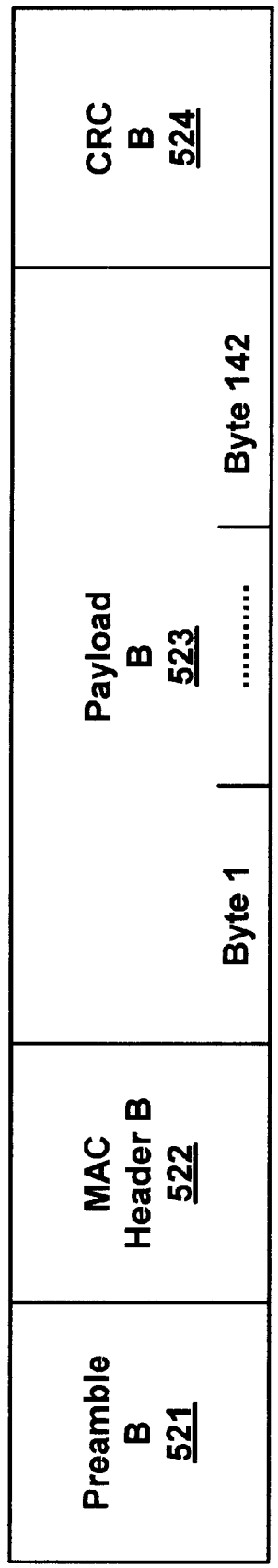
FIG. 5B illustrates the configuration of an intentionally aborted MAC communication frame 520 in one embodiment of communications network 400.

FIG. 5B illustrates the configuration of an intentionally aborted MAC communication frame 520 in one embodiment of communications network 400. MAC communication 520 comprises preamble B 521, MAC header B 522, payload B 523 and CRC B 524. Preamble B 521 is coupled to MAC header B 522, which is coupled to payload B 523 and payload B 523 is coupled to CRC B 524. MAC communication frame 520 occurs in an embodiment of the present invention in which a non-matching CRC is inserted in CRC B 524 when transmission of the MAC communication frame is intentionally aborted. In this embodiment CRC B 524 is a mathematical or configurational manipulation of a correct CRC based upon the information in MAC communication frame 520. In one example MAC frame generator 412 originally starts configuring MAC communication frame 510 with a payload comprising 193 bytes. Shortly after beginning transmission of MAC communication frame 510 MAC frame generator 412 determines that MAC communication frame 510 should be aborted before transmission is completed and decides to end the transmission after 142 bytes of payload have been configured. Therefore MAC frame generator 412 indicates to CRC calculator 413 to abort the present communication frame. CRC calculator 413 is computing a correct CRC value on the fly (e.g. in this example it is based on a payload of 142 bytes) for a MAC communication frame and performs a one's compliment, manipulation to make it non-matching. The non-matching one's compliment CRC C 524 is incorporated into the transmitted MAC communication frame 520 causing subscriber equipment 420 to discard MAC communication frame 520.

Figure 5C:
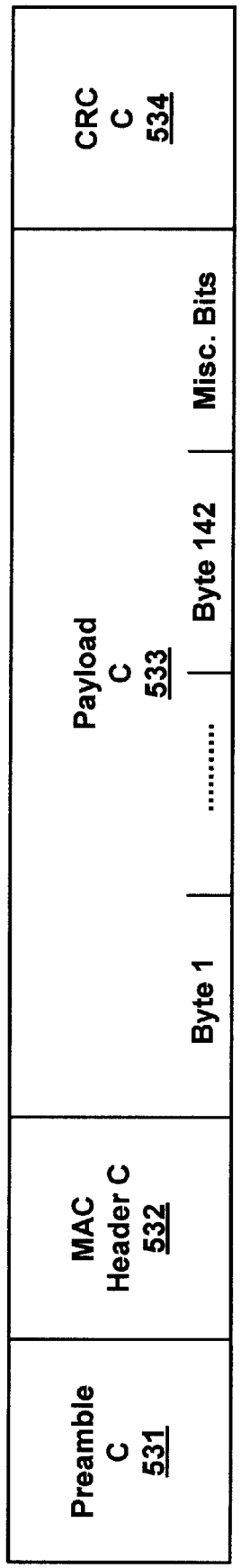
FIG. 5C illustrates another example of an intentionally aborted MAC communication frame 530 in one embodiment of communications network 400.

FIG. 5C illustrates another example of an intentionally aborted MAC communication frame 530 in one embodiment of communications network 400. MAC communication 530 comprises preamble C 531, MAC header C 532, payload C 533 and CRC C 534. Preamble C 531 is coupled to MAC header C 532, which is coupled to payload C 533 and payload C 533 is coupled to CRC C 534. Intentionally aborting MAC communication frame 530 is achieved by inserting "extra" bits in payload B 533. In this embodiment the MAC communication frame 530 is implemented under a similar scenario to MAC communication frame 520. MAC frame generator 412 originally starts transmitting MAC communication frame 510 with a payload comprising 193 bytes and then determines that MAC communication frame should be aborted before transmission is completed. CRC calculator 413 then computes a correct CRC value for a 142 byte payload MAC communication frame. However, MAC frame generator 412 inserts extra miscellaneous bits in payload 433 without providing this information to CRC calculator 413. CRC calculator 413 attaches a CRC value in CRC C 434 that is based upon a 142 byte payload and the CRC value is attached to MAC communication frame 430 with a payload of 142 bytes plus miscellaneous bits. Thus, the value in CRC C 434 is non-matching with the information transmitted in MAC communication frame 430 and subscriber equipment 420 aborts or discards MAC communication frame 530.

In another embodiment of the present invention transmitting devices determine if aborting a communication frame is efficient before intentionally aborting the communication frame. For example, if a relatively large low priority communication frame is initially configured and begins transmission an analysis is performed to determine if it is more beneficial to overall performance to allow the low priority communication frame to complete its transmission or abort it and transmit a high priority communication frame instead. In one embodiment of the present invention if a large low priority communication frame is almost completely transmitted when a the need for a higher priority communication arises, the lower priority communication frame is allowed to complete its transmission. In this embodiment aborting the almost complete low priority transmission and staring from the beginning at a later time is not the most efficient utilization of communication network resources, especially if devices waiting on the higher priority information have sufficient latency tolerances.

Figure 6:
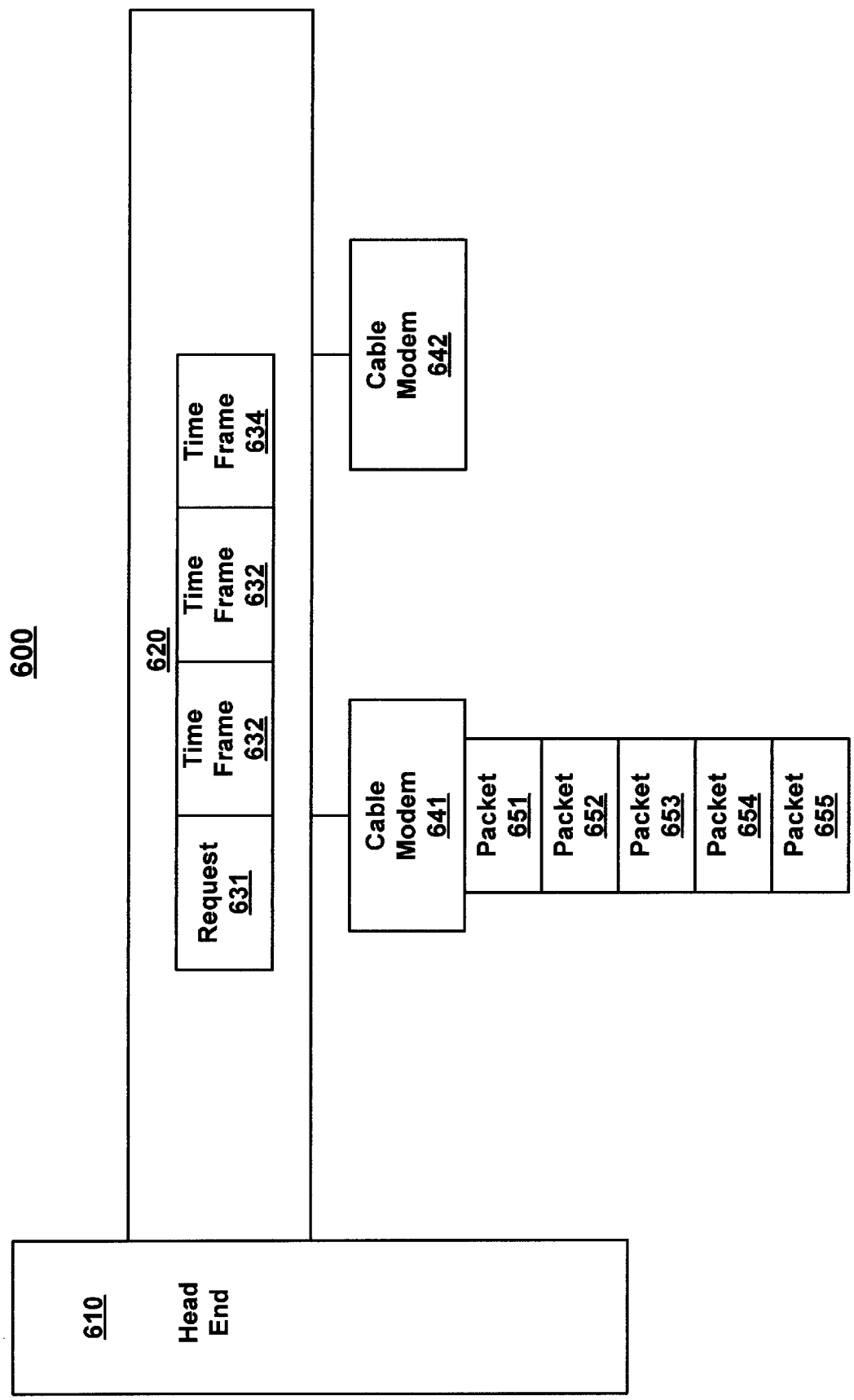
FIG. 6 is a block diagram illustration of a cable data system 600 in which one embodiment of the present invention is implemented.

FIG. 6 is a block diagram illustration of a cable data system 600. Cable data system 600 comprises head end component 610, cable 620, cable modem 641, cable modem 642, data packet 651, data packet 652, data packet 653, data packet 654, and data packet 655. Cable 620 comprises time frame 631, time frame 632, time frame 633, and time frame 634. Time frame 631 comprises a request from cable modem 641. Head end component 610 is coupled to cable 620, which is coupled to cable modem 641 and cable modem 642. Cable modem 641 is coupled to data packet 651, which is coupled to data packet 652. Data packet 653 is coupled to data packet 652 and data packet 654, which is coupled to data packet 655.

The components of cable data system 600 cooperate to transmit information between one another. Head end component 610 is responsible for controlling communication exchanges and managing data transmissions on cable data system 600. Cable 620 is a medium to convey information between components in cable data system 600 including a coaxial cable spread over long distances of several miles and installed in both overhead and underground facilities. Cable modem 641 and 642 are coupled to other downstream devices that are not shown (e.g., personal computers, digital televisions, digital telephones, digital network devices, etc.) and provide two-way interactive digitally networked communication exchanges between the downstream devices and other components of cable data system 600. Data packets 651 through 655 comprise packages of information in the form of packet protocol data units (PDU) that are transmitted between head end unit 610 and cable modem 641. This information includes messages and commands, such as a request for service, control codes associated with session management and data (e.g., such as contents of a file). Time frame 631 through 634 function as allocations of communication bandwidth on cable 620 for certain periods of time in which a device inserts its data (e.g., data packets 651 and 652) on cable 620 during time frames it is granted.

Cable data system 600 maintains functional compatibility with a number of industry specifications and standards while providing added features that permit lower priority transmissions to be aborted. In one embodiment higher priority information is transmitted in time slots originally allocated to lower priority information communications that are aborted. For example, cable data system 600 is compatible with multimedia cable network system (MCNS) data over cable standard interface specification (DOCIS) while permitting real time data to be placed onto cable 620 in an expedient manner. In one embodiment, the present invention utilizes media access control (MAC) frame format to maintain compatibility with industry standards and provide expedient communications.

Figure 7:
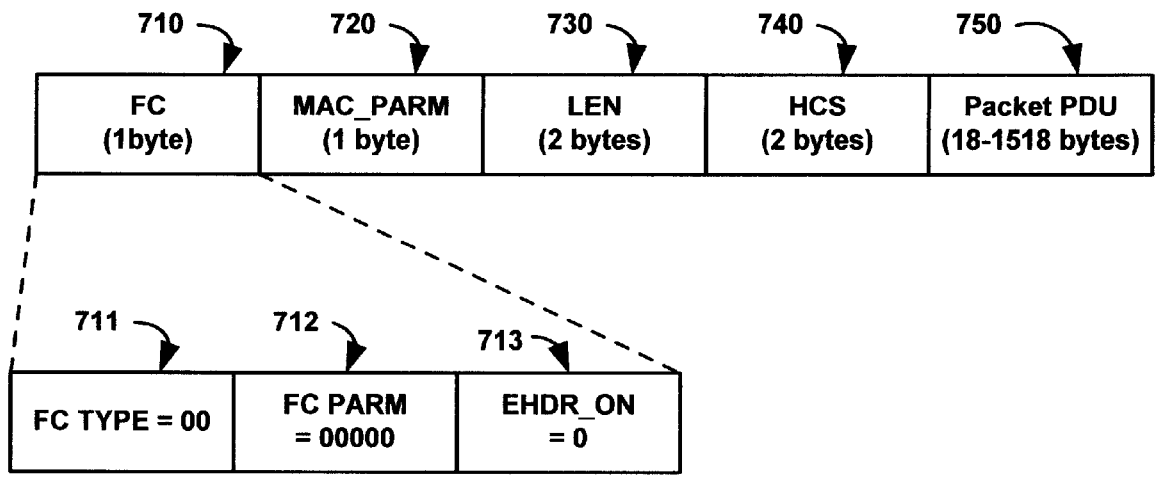
FIG. 7 is a block diagram illustrating one embodiment of a data-over-cable MAC frame 700 transmitted in cable data system 600.

FIG. 7 is a block diagram illustrating one embodiment of a data-over-cable MAC frame 700 transmitted in cable data system 600. Data-over-cable MAC frame 700 comprises FC section 710, MAC_PARM section 720, LEN section 730, HCS section 740, and Packet PDU 750. FC section 710 is coupled to MAC_PARM section 720, which is coupled to LEN section 730. LEN section 730 is coupled to HCS section 740, which is coupled to Packet PDU 750. FC section 710 comprises 1 byte of information that identifies the type of MAC header. The byte in FC section 710 comprises FC type bits 711, FC PARM bits 712 and EHDR_ON bits 713. In the present embodiment, FC type 711 bits are set to "00" indicating "packet MAC header". LEN section 730 comprises 2 bytes indicating the length of the MAC frame. HCS section 740 comprises 2 bytes and indicates the MAC header check sequence. Packet PDU 750 is an Ethernet/[ISO8802-3] type packet PDU comprising 18 to 1518 bytes representing data being transferred in the data over cable MAC frame 700.

Figure 8:
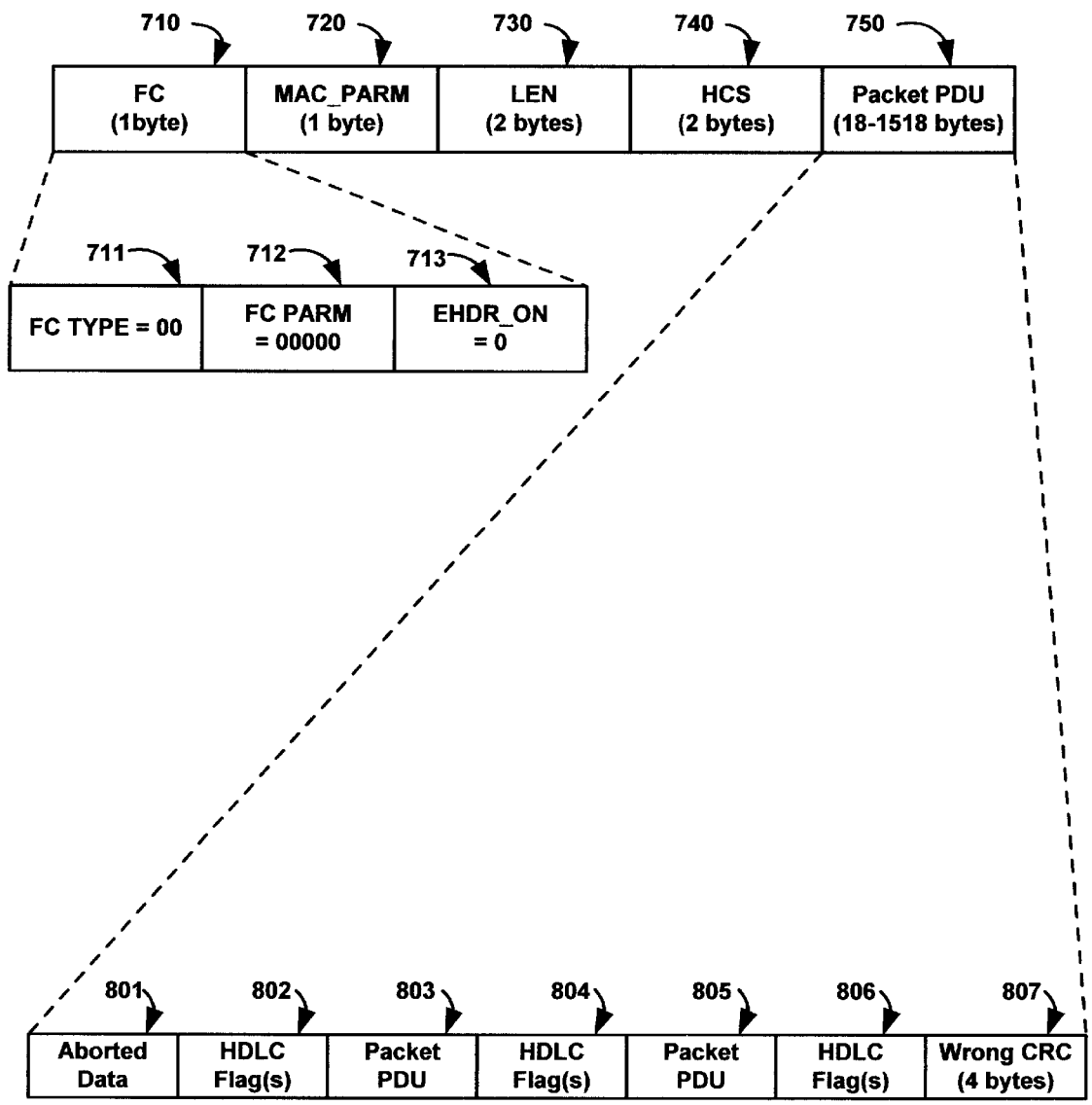
FIG. 8 is a block diagram of data-over-cable MAC frame 800, one embodiment of data-over-cable MAC frame in which a packet PDU includes indicators a communication frame comprises valid information even though the transmission of the communication frame was aborted.

FIG. 8 is a block diagram of data-over-cable MAC frame 800, one embodiment of data-over-cable MAC frame 700 in which packet PDU 750 comprises aborted data section 801, high level data link control (HDLC) flag sections 802, 804, and 806, packet PDU sections 803 and 805, and nonmatching cyclical redundancy check section 807. Aborted data section 801 is coupled to HDLC flag section 802, which is coupled to packet PDU section 803. HDLC flag section 804 is coupled to packet PDU section 803 and packet PDU section 805, which is coupled to HDLC flag section 806. HDLC flag section 806 is coupled to a non-matching cyclical redundancy check section 807. Aborted data section 801 comprises lower priority data that is to be discarded. HDLC flag section 802, 804, and 806 comprise HDLC flags, a specific sequence of bits (e.g., 01111110) that indicate the information between them is in a HDLC format. Packet PDU section 803 and 805 comprise higher priority information that a cable modem or a component coupled to the cable modem do not want discarded. Non-matching cyclical redundancy check section 807 comprises a signal to head end component 310 to discard data in aborted data section 801 of the frame.

Cable modem 641 or cable modem 642 initiate a transmission by forwarding a request to head end component 610 and if head end component 610 answers a signal exchange takes place that establishes the parameters for a communication session. If there is available bandwidth or time frames, head end 610 sends a message downstream to cable modem 641 indicating a specified time frame or frames (e.g. time frame 632 and 633) that are available for cable modem 641 to use for transmission of data packets (e.g. data packets in 651 and 652). In one example of communications in cable data system 600, after cable modem 641 sends a request up to head end 610 to engage in a low priority (e.g. data packet 651 and 652) communication, a no latency, real-time, high priority message data packet (e.g. data packet 653) is entered in a buffer queue. If higher priority information appears (e.g., data packet 653) before transmission of the data over cable MAC frame begins, cable modem 641 inserts appropriate HDLC flags and configures the data over cable MAC frame similar to the configuration shown in FIG. 8. Thus instead of waiting for lower priority data to be cleared out of a buffer queue, at which time a cable modem would have to request additional time frames to accommodate the no latency real-time high priority data (e.g. multimedia data), time frames that are currently allocated to a cable modem are utilized.

In one embodiment of the present invention, a cable modem determines if there is sufficient bandwidth (e.g. time frames) to accommodate higher priority information. This embodiment is utilized in situations when the higher priority information is received by the cable modem after transmission of a data over cable MAC frame including lower priority information has begun. For example in a situation where cable modem 641 has begun the actual transmission of lower priority information (e.g. data packet 651) and then receives higher priority information (e.g. packet 653) before the transmission is complete, cable modem 641 establishes if enough "space" for high priority bits remains in allotted time frames (e.g. 632 and 633) to include the higher priority information. Cable modem 641 establishes if enough "space" remains in the allotted time frames by first determining the number of bits comprising higher priority data to be included in a "transformed" data over cable MAC frame. Cable modem 641 then calculates how much time is required to make a transformation and accommodate transmission of the bits in the transformed data over cable MAC frame. If the calculated time is less than or equal to the time remaining in the allotted time frames the transformation is performed and the transformed data over cable MAC frame is inserted in the allotted time frames.

In both of the examples above, the transformed data over cable MAC frame follows the same format. After the insertion of high priority information, the transformed data over cable MAC frame is similar to the configuration shown in FIG. 8, including aborted data section 801 (e.g., comprising portions of data packet 651 and/or 652), HDLC flag 804, packet PDU 805 and HDLC flag 806, which immediately precedes the CRC bytes. Based on the information in the data over cable frame after the insertion of the high priority information, a non-matching CRC is configured. The non-matching CRC indicates the data over cable MAC frame includes information to be aborted or discarded. However, head end 610 is configured to recognize if a HDLC flag is immediately in front of CRC 807 and does not discard any packet PDU (e.g., packet PDU 805) in the data over cable MAC frame that is transmitted between two HDLC flags (e.g., HDLC flags 804 and 806).

The present invention is implemented in a variety of embodiments. In one embodiment, the "non-matching" CRC utilized in a high priority transmission is configured in a manner that indicates to the receiving station that high priority data is included in the payload. For example, in one embodiment if a frame comprises a non-matching CRC the receiving device determines if it is a one's compliment. In this embodiment a non-matching CRC that is a one's compliment indicates to a receiving device that the frame includes low priority information that should be discarded and high priority information that should not be discarded.

In another embodiment packet PDUs (e.g., packet PDU 805) transmitted between two HDLC flags (e.g., HDLC flags 804 and 806) comprise their own CRC in the packet PDU. These CRC's within the packet PDU are calculated based upon the information in the packet PDU and are utilized by the receiving component (e.g., head end 610) to determine if the packet PDU is valid. In one embodiment, the additional CRC in a packet PDU addresses a situation in which there is no high priority information and a data over cable frame is to be entirely aborted and by coincidence there is a HDLC flag immediately preceding a CRC of the data over cable frame. A CRC in an encapsulated packet PDU is also used as a double check to avoid situations in which a value in a CRC for the entire cable over data MAC frame coincidentally just happens to be equivalent to the predetermined value.

Figure 9:
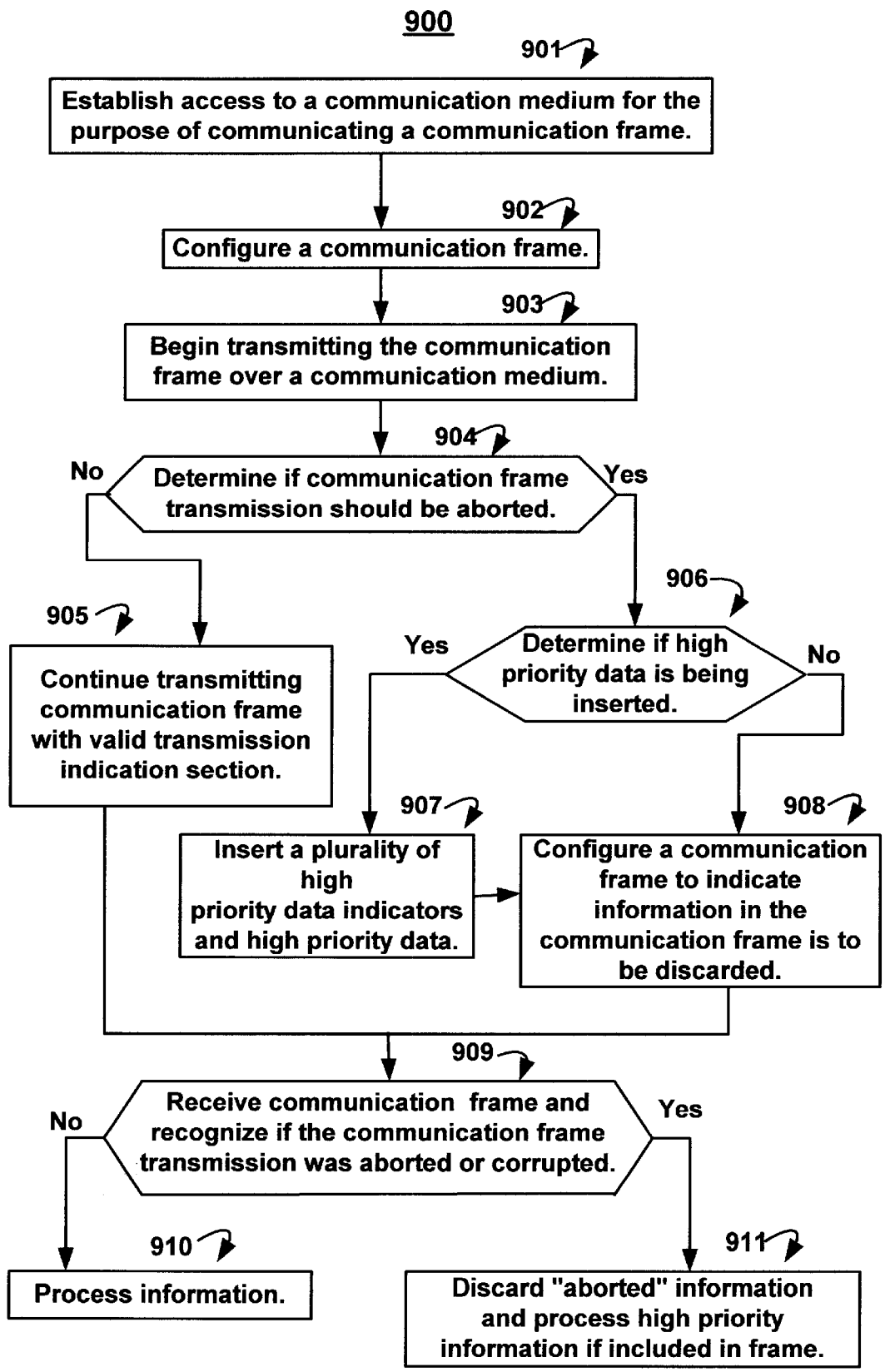
FIG. 9 is a flow chart of the steps in communication abort method 900, one embodiment of the present invention.

FIG. 9 is a flow chart of the steps in communication abort method 900, one embodiment of the present invention. Communication abort method 900 operates in a communication network transmitting information in communication frames. In one embodiment communication abort method 900 is utilized in a communications network system including a data over cable media access control frame with an Ethernet/[ISO8802-3] type packet protocol data unit payload. In another embodiment communication abort method 900 is utilized in a communications network system including LMDS protocol. In some embodiments communication abort method 900 is utilized to free up communication resources in a manner that permits higher prioritized information to be transferred before lower prioritized information.

In Step 901 communication abort method 900 establishes access to a communication medium for the purpose of communicating a data communication frame. In one embodiment of communication abort method 900, establishing access to a communication medium is accomplished by requesting access from a head end component to time frames for transmitting a data over cable media access control frame. If the head end determines there are available time frames it grants a cable modem access to the available time frames for transmitting said data over cable media access control frame.

A communication frame is configured in Step 902 to include a transmission indication section. In one embodiment a communication frame is configured to be compatible with an Ethernet protocol for use in an Ethernet network. In another embodiment this configuration includes creating a preamble section, a MAC header section, a payload section, and a transmission status indicator section.

As the configuration is proceeding, transmission of the communication frame is begun in Step 903. In one embodiment the transmission includes placing the fixed length data communication frame on a coaxial cable. In another embodiment the communication frame is conveyed via radio propagation.

In Step 904 a determination is made if a communication frame transmission should be aborted. A number of factors influence whether a communication frame should be aborted. For example, if a communication network is currently transmitting lower priority information when higher priority information is waiting to be communicated. In one embodiment of communication abort method 900, an analysis is performed that weighs the benefits of aborting a message to make communication network resources available for other purposes against the cost of having to retransmit the aborted message at a later time. In this embodiment communication abort method 900 compares relative latency tolerances of communication frames waiting to be transmitted to the amount of information already transmitted in a frame being considered to be aborted. If a communication frame should not be aborted the transmission continues in step 905. If a communication frame transmission should be aborted the process proceeds to step 906.

In Step 906 the process determines if high priority data is being inserted in a communication frame. If high priority data is not being inserted in the communication frame the process proceeds to Step 908 (in one embodiment the CRC value is calculated on the fly in parallel with configuring the communication frame). If high priority data is being inserted the process proceeds to Step 907.

In Step 907 a plurality of high priority data indicators is inserted in a communication frames comprising high priority data that is not to be aborted. The high priority data is inserted between each one of the plurality of high priority data indicators. In one embodiment, inserting a plurality of high priority data indicators includes injecting a plurality of high level data link control flags into a data over cable media access control frame. Higher priority protocol data unit packets are put between one of said plurality of high level data link control flags and another one of said plurality of high level data link control flags. Some communication frames are configured to indicate there is high priority data included in the communication frame that should not be aborted even though there is an non-matching CRC inserted in the frame. In one embodiment, a protocol data unit packet between one of a plurality of high level data link control flags and another one of said plurality of high level data link control flags indicates high priority data should not be aborted.

In Step 908 a communication frame is manipulated on the fly (in parallel with configuration of the communication frame) so that the transmission indication section indicates that the communication frame transmission is being aborted and indicate information is to be discarded. If high priority data is inserted in the communication frame in Step 907 the high priority information is not discarded and the other information in the communication frame is discarded. In one embodiment of the present invention an accurately calculated CRC value is manipulated (using the data up to the time the decision is made to abort) to provide a non-matching CRC. For example, a ones compliment of a correct CRC value is inserted in the communication frame instead of the correct CRC value. In another example a CRC is calculated based upon initial information in a communication frame. Then the configuration frame is changed (e.g., adding miscellaneous bits) without changing the CRC that is to be attached or appended to the communication frame. There is a wide variety of communication frame configurations that are included in various embodiments of Step 902 and manipulated in Step 906.

In Step 909 the communication frame is received and communication abort method 900 recognizes when a communication frame includes an indication that there was a transmission problem including situations in which the transmission of the communication frame was aborted. In one embodiment of communication abort method 900 a receiving device recognizes a non-matching CRC is inserted to provide an indication the transmission of the communication frame is aborted. If there is an indication that the information in a communication frame is reliable and it was not aborted during transmission the receiving device processes the information in Step 910. If there is an indication that there is an error in the information in a communication frame or it was aborted during transmission the receiving device discards information included in the communication frame in Step 911. However, if there is any high priority information included in the communication frame it is processed and not discarded.

In one embodiment, of communication abort method 900, a receiving device recognizes an indication that some information within a communication frame is aborted and some is not. In one embodiment a communication frame includes a transmission status indication (e.g., a non-matching CRC), a plurality of high priority data indicators and high priority data. The receiving device recognizes that high priority data included in between each one the plurality of high priority data indicators is valid. To recognize this type of configuration, communication abort method 900 determines if a protocol data unit packet is between one of the plurality of high level indicator sections and another one of said plurality of high level indicator sections and by virtue of its location between the high level priority indicators considers it valid data. In one embodiment of communication abort method 900 each one of the plurality of high level indicator sections includes a high level data link control flag and a packet protocol data unit situated between high level data link control flags is accepted as valid. In one embodiment, communication abort method 900 is implemented in a computer with an interface card for coupling to a communication network.

Thus, the system and method of the present invention provides access to communication network resources in an efficient and timely manner. The system and method of the present invention permits information transmissions to be aborted and facilitates the availability of communication network resources for other communications. The present invention increases the probability that higher priority data in data communication frames are granted access to communication bandwidth expeditiously while minimizing impacts to communication flow and conserving communication network resources. It is applicable to existing communication networks in a manner that preserves the usefulness of communication protocols while minimizing adverse affects on network infrastructure.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In computer system with an interface card for coupling to a communication network, the method comprising the steps of:

establishing access to a communication medium for the purpose of communicating a communication frame;

configuring said communication frame with an transmission indication section that indicates transmission of said communication frame is being aborted;

transmitting said communication frame over said communication medium; and calculating a cyclical redundancy check value based upon initial information in said communication frame;

transforming said calculated cyclical redundancy check value so that it is non-matching with said communication frame by creating a ones compliment of said calculated cyclical redundancy check; and appending said transformed cyclical redundancy check value to said communication frame instead of said calculated cyclical redundancy check value.

2. The method of claim 1 further comprising the steps of:

calculating a cyclical redundancy check value based upon initial information in a communication frame;

attaching said cyclical redundancy check value to said frame; and changing said communication frame by altering bits in a data payload section of said communication frame without changing sid cyclical redundancy check value.

3. In communication network, a method for aborting communication frames, the method comprising the steps of:

a) establishing access to a communication medium for the purpose of communicating a communication frame;

b) configuring said communication frame to include a transmission indication section;

c) transmitting said communication frame over said communication medium, including:

calculating a cyclical redundancy check value based upon initial information in said communication frame;

transforming said calculated cyclical redundancy check value; and appending said transformed cyclical redundancy check value to said communication frame instead of said calculated cyclical redundancy check value;

d) determining if said transmission of said communication frame should be aborted; and e) manipulating information in said communication frame so that said transmission indication section indicates transmission of said communication frame is being aborted.

4. The method of claim 3 wherein step a) further comprises the steps of:

requesting access from a head end component to time frames for transmitting a data over cable media access control frame; and granting a cable modem access to time frames for transmitting said data over cable media access control frame.

5. The method of claim 3 wherein step c) further comprises the steps of:

placing a non-matching cyclical redundancy check value in said transmission status section that indicates information in said data over cable media access control frame is to be aborted.

6. The method of claim 3 wherein transforming said calculated cyclical redundancy check value includes creating a ones compliment so that logical ones are changed to logical zeroes and logical zeros are changed to logical ones.

7. The method of claim 3 wherein step c) further comprises the steps of:

calculating a cyclical redundancy check value based upon initial information in said communication frame;

attaching said cyclical redundancy check value to said frame; and changing said communication frame without changing said cyclical redundancy check value.

8. The method of claim 7 wherein changing said communication frame is accomplished by adding miscellaneous bits to a data payload section of said communication frame.

9. The method of claim 3 wherein step b) further comprises creating a preamble section, a MAC header section, a payload section, and a transmission status indicator section in said communication frame.

10. The method of claim 3 wherein step b) further comprises creating a data over cable media access control frame with and Ethernet/ISO8802-3 type packet protocol data unit payload.

11. The method of claim 3 wherein step b) further comprises the steps of inserting in said communication frame a plurality of high priority data indicators with high priority data between each one of said plurality of high priority data indicators.

12. The method of claim 3 further comprising the steps of:

receiving said fixed length data communication frame;

recognizing an indication that the transmission of the communication frame was aborted; and discarding information.

\* \* \* \* \*